(12) United States Patent
Portisch et al.

(10) Patent No.: US 11,755,591 B2
(45) Date of Patent: Sep. 12, 2023

(54) METADATA OBJECT IDENTIFIER REGISTRY

(71) Applicant: SAP SE, Walldorf (DE)

(72) Inventors: Jan Portisch, Bruchsal (DE); Sandra Bracholdt, Dielheim (DE); Ulrich Block, Walldorf (DE); Volker Saggau, Bensheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/395,901

(22) Filed: Aug. 6, 2021

(65) Prior Publication Data

US 2023/0047681 A1 Feb. 16, 2023

(51) Int. Cl.
*G06F 16/2457* (2019.01)
*G06F 16/23* (2019.01)
*G06F 16/38* (2019.01)

(52) U.S. Cl.
CPC .... *G06F 16/24573* (2019.01); *G06F 16/2365* (2019.01); *G06F 16/38* (2019.01)

(58) Field of Classification Search
None
See application file for complete search history.

(56) References Cited

U.S. PATENT DOCUMENTS

| | | | | |
|---|---|---|---|---|
| 2004/0128276 A1* | 7/2004 | Scanlon | ................... | G06F 16/38 |
| 2006/0020580 A1* | 1/2006 | Dettinger | .............. | G06F 16/284 |
| 2006/0271528 A1* | 11/2006 | Gorelik | ............... | G06F 16/2468 |
| 2008/0147628 A1* | 6/2008 | Dettinger | .......... | G06F 16/24526 |
| 2011/0213778 A1* | 9/2011 | Hess | .................. | G06F 16/2471 707/E17.089 |
| 2013/0031117 A1* | 1/2013 | Mandelstein | ......... | G06F 16/214 707/758 |
| 2013/0346444 A1* | 12/2013 | Makkar | ................. | G06F 16/907 707/770 |
| 2016/0019259 A1* | 1/2016 | Liu | ..................... | G06F 16/2455 707/769 |

OTHER PUBLICATIONS

"Identifier", Wikipedia [Online]. Retrieved from the Internet: <URL: https://en.wikipedia.org/w/index.php?title=Identifier&oldid=1131150219>, (Jun. 7, 2021), 6 pgs.

* cited by examiner

*Primary Examiner* — Irene Baker
(74) *Attorney, Agent, or Firm* — SCHWEGMAN LUNDBERG & WOESSNER, P.A.

(57) ABSTRACT

Various examples are directed to systems and methods for administering data model metadata for a plurality of data models. A metadata service may receive a first retrieval request from a requesting system. The first retrieval request may comprise an indication of a first local object identifier referencing a definition of a first local object from a first data model and an indication of a target data model. The metadata service may retrieve a first record from a metadata identifier registry, where the first record comprises an indication of the first local object identifier and an indication of a first global object identifier corresponding to the first local object identifier. The metadata service may determine a second local object identifier referencing a definition of a second local object identifier referencing a definition of a second local object in the target data model and return the second local object identifier.

20 Claims, 9 Drawing Sheets

METADATA OBJECT IDENTIFIER REGISTRY

BACKGROUND

Enterprises that use computing systems and applications often store the data processed by the computing systems and applications in databases having large and complex schemas. During execution, the application reads data from the database and may write results to the database.

BRIEF DESCRIPTION OF DRAWINGS

The present disclosure is illustrated by way of example and not limitation in the following figures.

DETAILED DESCRIPTION

Figure 1:
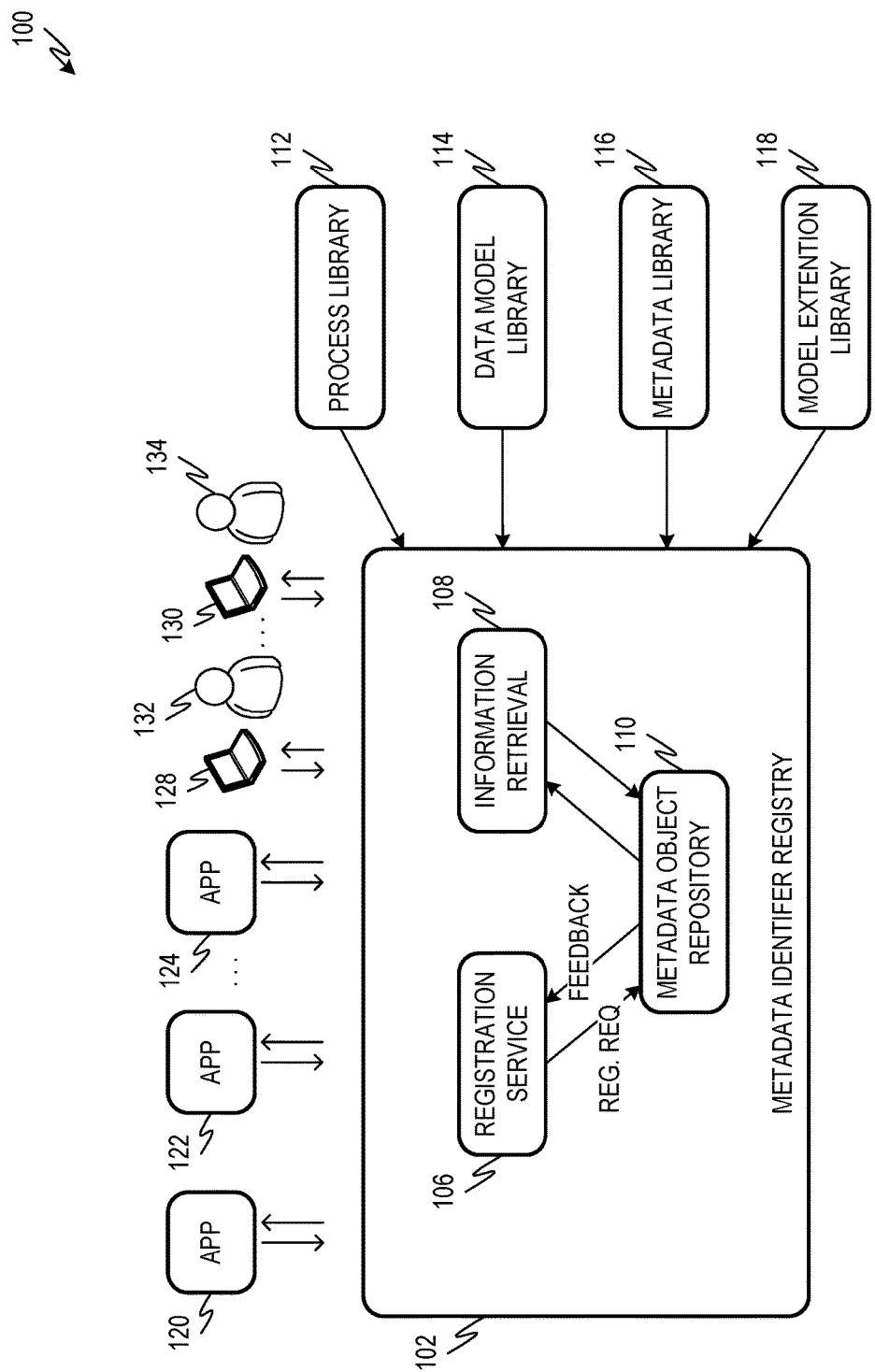
FIG. 1 is a diagram showing one example of an environment for implementing a metadata identifier registry.

Computing systems and software depend on the ability to reference objects, including entity objects (also called entities herein) and process objects (also called objects herein). Consider an example software application for managing the shipping of orders to retail customers. Such a software application uses various different entities including, for example, entities such as customer first name, customer last name, customer address, customer city, customer postal code, product identifier, and so on. The software application also uses processes such as, for example, for creating an order, for sending a shipping instruction, for initiating the creation of a shipping label, and the like.

To effectively use objects, including entities and processes, a software application uses a data model that relates the different objects to one another. The data model includes metadata describing various objects, including entities and processes. For example, a data model can include various object definitions that describe objects used by the application. Object definitions may have corresponding object identifiers, where an object identifier uniquely identifies an object definition at the application data model.

Complications arise, however, when different software applications use different data models having equivalent but incompatible object identifiers. For example, one application data model may include an entity called "business partner" while another application data model may include an equivalent, but differently named entity called "customer." Also, different data models may use different object identifier formats, such as a Universally Unique Identifier (UUID) format, a Uniform Resource Identifier (URI) format. Some applications may use object identifiers from an Operational Data Model (ODM), for example, implemented by the enterprise and/or one of the application provider.

There are a number of situations where it is desirable to reconcile different data models. For example, applications may have need to communicate with one another while referring to common data objects. Accordingly, it may be desirable to share data between applications to avoid the need to populate and maintain separate data stores. Consider an example in which the enterprise using the shipping management application described herein also uses an accounting application with a process for managing receivables. Both the accounting and the shipping management application may use objects related to enterprise customers including, first name, last name, and so on. Reconciling the data models of the two applications may allow the use of a common database storing object instances for enterprise customer first name, last name, and so on.

Another situation where it is desirable to reconcile application data models is when an application is upgraded from one version to another or when the application is replaced by a different application using a different data model, such as a software application provided by a different vendor. Reconciling the data model used by the prior application with the data model used by the upgraded application may be desirable to make it easier to use the upgraded application with the environment of other applications and the same data stores that were used by the previous application.

One example way to reconcile data models between applications is to develop the applications to use a common data model. The common data model may include a global object identifier for each object. Individual applications are then built and/or modified to use the global object identifiers from the common data model. This, however, can add complexity and expense to the application development process and may not always be practical. For example, using a common data model for different applications may involve constraining developers to either work using the common set of global object identifiers and/or add complexity and expense when developers have to coordinate with one another to make changes to a common data model. Also, organic business operations may make common data models difficult to maintain over time. For example, a desire to share data between applications may arise after the applications are completed.

In some examples, data models can be reconciled using a mapping. A mapping describes relationships between data object identifiers for different data models. For example, a mapping between two different data models would relate different object identifiers to one another allowing translation between the two data models. Creating and maintaining a mapping, however, can be complicated and labor-intensive. Also, mappings may need to be upgraded when one or both of the mapped data models are changed.

Consider an example in which an enterprise has implemented a proprietary data model but wants to upgrade to a vendor-provided data model. This can be accomplished by generating a mapping between the proprietary data model and vendor-provided data model. Generating such a mapping is non-trivial, however. For example, enterprise database schemas describing a data model may include thousands of entities, attributes, and relations therebetween. Reading and relating these entities, attributes, and relations from one data model to another can be labor-intensive. Also, any updates to the proprietary data model and/or to the vendor-provided data model made during the mapping may break the mapping. This means that the mapping may require repeated updating and alignment to continue to accurately represent the relationship between the two data models.

Consider another example in which an enterprise desires to track the history of an entity across the data models used by different versions of a vendor-provided application. Across versions, some entities may be removed and replaced with successor entities. Other entities may be enhanced or otherwise changed. Creating a mapping to track the history of entities can be complicated when the enterprise has implemented all of the data model versions provided by the software vendor. In cases where the enterprise did not implement all versions, however, complications increase. For example, if the enterprise implemented versions 1.5 and 1.7 of the application, but failed to implement version 1.6, mapping objects from version 1.5 directly to version 1.7 may be complicated.

Consider another example, in which a developer is creating a management cockpit application or other software solution that utilizes objects from more than one application. For example, the cockpit application may include features for a user to monitor and manage multiple other applications, which may be provided by the same vendor or different vendors. Accordingly, the management cockpit may reference various objects that are referred to by different object identifiers by the different applications, and even different types of object identifiers. For example, one application may use a URI as the unique identifier for one object while another application uses UUID object identifiers. Creating the management cockpit may involve generating a complicated mapping between multiple different data models.

Various examples address these and other challenges by providing a metadata identifier registry. The metadata identifier registry maintains a metadata object repository that stores data about object identifiers from data models used by different applications. The object identifiers described by the metadata identifier registry may identify object definitions. For example, a local object identifier references an object definition at a data model used by one or more applications. The metadata object repository may store various information about local object identifiers including, for example, the data model or data models that use the local object identifier, the version of the data model or models that use the local object identifier, relationships between the local object identifier and the like.

The metadata object repository may also describe global object identifiers. A global object identifier is linked at the metadata object repository to one or more local object identifiers that are equivalent to the global object identifier. In this way, global object identifiers may be used to translate between equivalent local object identifiers in different data models. For example, a first local object identifier from a first data model may be used to identify an equivalent global object identifier. The global object identifier may then be used to find local object identifiers equivalent to the first local object identifier.

In some examples, the metadata object repository may also store relationships between local object identifiers. For example, one local object identifier may refer to an object definition that is a successor to, predecessor to, or have another relationship to another local object identifiers. In some examples, the metadata object repository may also store relationships between local object identifiers and version data indicating a version of the application or a version of the application data model with which the local object identifier is associated.

The metadata identifier registry may implement an information retrieval service and a registration service. The information retrieval service receives retrieval requests. A retrieval request may be received from an application and/or from a user. The retrieval request may include a subject local object identifier and requested information about the subject local object identifier. For example, the requested information may include a local object identifier from another data model that is equivalent to the subject local object identifier, a local data object that represents a different version of the subject local object identifier in the same data model, and/or the like. The information retrieval service uses the metadata object repository to determine the requested information about the subject local object identifier and returns results to the requestor.

For example, a first application may make a retrieval request prior to communicating with a second application. The first application's retrieval request may indicate a subject local object identifier at the first application's data model and request information about an equivalent of the subject local object identifier at the data model used by the second application. The information retrieval service may return a second local object identifier from the second application's data model that is equivalent to the subject local object identifier. The first application may use the second local object identifier to communicate with the second application.

Referring again to the management cockpit example described herein, the developer creating the cockpit may prepare and send query requests to the information retrieval service to find the local object identifiers for the objects used by the cockpit application in the different applications to be managed. Also, referring again to the example in which the history of an entity is tracked across different versions of an application, the maker of the history may make retrieval requests to determine successor and/or predecessor objects in order to create the history.

The registration service may execute to register a local object identifier at the metadata object repository. Registration requests may be received from applications and/or users. For example, an application may request registration of one or more of the local object identifiers of its application data model. Also, in some examples, a user may request registration of a local object identifier. The registration request may include an indication of the subject local object identifier along with information related to the subject local object identifier, such as a data model associated with the local object identifier, a data model version associated with the local object identifier or a global object identifier associated with the local object identifier. The registration request may include other information, such as, for example, the local object identifier of a predecessor local object, the local object identifier of a successor local object, and the like. The registration service incorporates the local object identifier into the metadata object repository, for example, by adding one or more nodes or edges to the repository, as described herein.

In some examples, the information retrieval service and registration service may operate in conjunction with one another. For example, if the information retrieval service receives a retrieval request referencing a local object identifier that is not otherwise described at the metadata object repository, the retrieval request may trigger a registration request for the local object identifier. The local object identifier may be added to the metadata object repository with information that is available.

In some examples, the metadata identifier registry operates according to an open world assumption such that the metadata identifier registry may be updated with less than full information about the corresponding local object identifier. Consider an example in which a local object identifier is to be added to the metadata object repository as part of a registration request. In some examples, the registration request may not include a corresponding global object identifier. The registration service may be configured to select a candidate global object identifier that can be associated with the new local object identifier. Consider another example in which a registration request does not include information such as, for example, a version, a successor local object identifier, a predecessor local object identifier, or the like. The registration service may add the local object identifier to the metadata object repository with the information that is available and may permit additional information to be added later.

The metadata identifier registry may be arranged so as to permit centralization of object identifier relationships and information without limiting the systems and application implementing the respective application data models. For example, the metadata identifier registry may build and make available the centralized metadata object repository including information relating object identifiers from different data models. The applications may not need to be modified to use different data models or a common data model. Instead, applications may, directly or indirectly, access the metadata identifier registry to retrieve and utilize object identifier data.

FIG. 1 is a diagram showing one example of an environment 100 for implementing a metadata identifier registry service 102. The environment 100 comprises a metadata identifier registry service 102, applications 120, 122, 124 and user computing devices 128, 130.

The metadata identifier registry service 102 includes a metadata object repository 110, a registration service 106, and an information retrieval service 108, described in more detail herein. The metadata identifier registry service 102 may be implemented using various computing hardware including, for example, one or more servers, one or more database management systems, etc. In some examples, the metadata identifier registry service 102 is implemented at one or more server computing devices that are accessible to the applications 120, 122, 124 and user computing devices 128, 130. For example, the metadata identifier registry service 102 may be provided to the various applications 120, 122, 124 and user computing devices 128, 130 as a cloud service.

The metadata identifier registry service 102 may be implemented by a service provider entity that provides the metadata identifier registry as a service to one or more partner and/or customer entities. For example, users 132, 134 may be associated with one or more customer entities. Also, for example, instances of applications 120, 122, 124 may be executed for one or more of the partner and/or customer entities. In some examples, the metadata identifier registry service 102 is implemented by an entity that also provides one or more of the applications 120, 122, 124 for use by the users of partner and/or customer entities.

Applications 120, 122, 124 may be or include any suitable application or application type. For example, some applications 120, 122, 124 may provide a software solution to the users 132, 134 of customer and/or partner entities. The software solution may include, for example, a human resources management solution, a supply chain management solution, an accounting solution, etc. In some examples, one or more of the applications 120, 122, 124 provides a service consumed by other applications, such as a database management system or other service. For example, a partner entity may consume a service provided by one of the applications 120, 122, 124 to provide another of the applications to the users of its own customers.

Applications 120, 122, 124 may be implemented using any suitable type of on-premises or remote implementation. In some examples, one or more of the applications 120, 122, 124 are on-premises applications, with instances of the applications 120, 122, 124 executed, for example, by one or more customer entities using a data center managed by the customer entity. Users 132, 134 associated with the entity may access the on-premises implementation of the application or applications 120, 122, 124. Also, in some examples, one or more of the applications 120, 122, 124 is a cloud-implemented application, where one or more instances of the application 120, 122, 124 for uses of different customer entities are executed in a cloud environment. For example, one or more of the applications 120, 122, 124 may be provided using a Software as a Service (SaaS) arrangement.

As described herein, the various applications 120, 122, 124 utilize data models to define different objects and relate the objects to one another. Some applications 120, 122, 124 implement an application-specific data model that is used exclusively by the application 120, 122, 124. Other applications 120, 122, 124 may use a common data model, such as a canonical data model, that is shared between more than one application 120, 122, 124.

In some examples, the metadata identifier registry service 102 may also be in communication with one or more users 132, 134 as described in more detail herein. Users 132, 134, in some examples, are associated with a customer or partner entity. A user 132, 134 may be a user of one or more of the applications 120, 122, 124 and/or may be a developer (e.g., at a partner entity) developing an application 120, 122, 124. For example, a user 132, 134 may be building a mapping or developing an application or other solution that uses objects (e.g., entities and/or processes) from different data models. The users 132, 134 may query the metadata identifier registry service 102 to retrieve metadata object information that can be used to build the mapping, application, solution and the like. Users 132, 134 may also register local metadata objects with the metadata identifier registry service 102 as described herein. Users 132, 134 may interact with the metadata identifier registry service 102 utilizing one or more user computing devices 128. The user computing devices 128, 130 may be or include any sort of user computing device including, for example, a desktop computer, a laptop computer, a tablet computer, other mobile computing device, and the like.

The metadata identifier registry service 102 comprises a metadata object repository 110, a registration service 106 and an information retrieval service 108. The metadata object repository 110 stores information about metadata object identifiers including, for example, relationships between metadata object identifiers and relationships between metadata object identifiers and between metadata object identifiers and other concepts, such as the native data model of an local object identifier, a version of the native data model of the local object identifier, etc.

The metadata object identifiers referenced at the metadata object repository 110 may include local object identifiers and global object identifiers. A local object identifier is an object identifier referencing an object definition from a native data model (e.g., a data model used at one or more of the applications 120, 122, 124). A global object identifier is an object identifier used by the metadata identifier registry to relate local metadata object identifiers that are equivalent to one another.

In some examples, the metadata object repository 110 stores information about metadata object identifiers using a schema comprising nodes and edges. Nodes of the schema may correspond to metadata object identifiers, including local object identifiers and global object identifiers. Nodes of the schema may also correspond to native data models from which local object identifiers originate. Edges of the schema may correspond to relationships between the nodes. For example, a specification edge may relate a local object identifier to an equivalent global object identifier. A system edge may relate a local object identifier to the native data model that includes the definition of the corresponding object. A version edge may relate a local object identifier to the version of the corresponding application data model (which may be represented as a string). In some examples, an edge may relate different local object identifiers to one another. For example, a successor edge may relate a first local object identifier to a second local object identifier that is the successor of the first local object identifier at a native application data model. Similarly, a predecessor edge may relate a first local object identifier to a second local object identifier that is a predecessor of the first local object identifier at the relevant native data model. Additional examples describing metadata object repository schemas are described herein with respect to FIG. 3.

In some examples, the metadata object repository 110 may be stored using a triple store or label-property-graph style of database. For example, records at the metadata object repository 110 may include a first field indicating a local object identifier, a second field indicating a native data model, another data object identifier, or a version number, and a relationship field indicating a relationship between the local object identifier at the first field and the content of the second field.

Consider an example in which the second field indicates a global object identifier. In this example, the relationship field may indicate a specification-type edge showing that the local object identifier is equivalent to the global object identifier. Consider another example in which the second field indicates a second local object identifier. The relationship field may indicate a relationship between the local object identifier and the second local object identifier (e.g., predecessor, successor, and/or the like). In another example, the second field may indicate a native data model. The relationship field may indicate that the local object identifier is from the indicated native data model. In another example, the second field may indicate a version number. The relationship field may indicate that the local object identifier is from the indicated version of its native data model. The use of a triple store or label property graph may lead to efficiencies in the registration and retrieval of information about local object identifiers, as described herein.

The information retrieval service 108 may respond to retrieval requests from one or more applications 120, 122, 124 and/or from one or more users 132, 134 via user computing devices 128, 130. A retrieval request may include a subject local object identifier and requested information. The subject local object identifier may be from a subject data model. For example, an application 120, 122, 124 may make a retrieval request using a subject local object identifier from its own native data model. Also, a user 132, 134 and/or application 120, 122, 124 may make a retrieval request for a subject local object identifier from a different application's data model. The requested information indicates requested information about the subject local object identifier that is to be returned in response to the retrieval request.

In some examples, the requested information indicates that the requestor expects a data model version number for the subject local object identifier, a data model name for the subject data model, or other information. Also, in some examples, the requested information indicates that the requestor expects to receive an additional local object identifier that is related to the subject local object identifier, such as a successor local object identifier, a predecessor local object identifier, and the like.

In some examples, the requested information indicates a target application data model and information about a relationship between the subject local object identifier and the target application data model. For example, the requested information may request a local object identifier in the target data model that is equivalent to the subject local object identifier. In other examples, the requested information may request a local object identifier in the target application data model that is a successor to or predecessor to the local object identifier in the target application data model that is equivalent to the subject application data model.

The registration service 106 may respond to registration requests received, for example, from applications 120, 122, 124 and/or users 132, 134. A registration request may comprise a subject local object identifier referencing an object definition from a data model. The registration service may process the registration request by creating an entry for the local object identifier at the metadata object repository 110. For example, the registration service 106 may create one or more schema elements, such as nodes and edges, for the local object identifier.

In some examples, a registration request is prompted in response to a retrieval request. For example, if an application 120, 122, 124, or user 132, 134 makes a retrieval request with a subject local object identifier that is not described at the metadata object repository, the metadata identifier registry service 102 may perform a registration request for the previously-unregistered local object identifier. The registration request may incorporate any other information about the local object identifier that can be determined from the retrieval request and/or the party making the retrieval request. For example, the if the retrieval request was received from an application 120, 122, 124, the registration service 106 may associate the local object identifier with the requesting application 120, 122, 124, a version thereof, and/or a data model used by the application 120, 122, 124.

In some examples, the registration service 106 need not have all information about a local object identifier before registering the local object identifier at the metadata object repository. This may be consistent with the open world assumption. For example, a registration request, in some examples, may not include a global object identifier corresponding to the received local object identifier. In some examples, the registration service 106 is configured to generate a suggested global object identifier. The suggested global object identifier may either be automatically associated with the local object identifier at the metadata object repository 110 and/or provided to the requesting party (e.g., application 120, 122, 124 and/or user 132, 134) for approval.

In some examples, the registration service 106 registers a local object identifier with the available information in a way that may be supplemented at a later time. For example, the registration service 106 may receive a first registration request indicating a first local object identifier and a corresponding system or application data model. The registration service 106 may relate the first local object identifier to the corresponding system at the metadata object repository. Subsequently, the registration service 106 may receive additional information such as, for example, a successor or predecessor local object identifier from a new or previous version of the application data model. The registration service 106 may then supplement the metadata object repository In some examples, registering local object identifiers with less than complete information and/or prompting registration requests in response to retrieval requests with unregistered local object identifiers increases the extensibility and flexibility of the metadata identifier registry service 102. In this way, the metadata identifier registry service 102 may build the metadata object repository in a way that minimizes cost and effort of the applications 120, 122, 124 or users 132, 134.

In the example of FIG. 1, metadata identifier registry service 102 is in communication with any one or more of a process library 112, a data model library 114, a metadata library 116, and a model extension library 118. The process library 112, data model library 114, metadata library 116 and model extension library 118 may be implemented, for example, by one or more data stores, servers, or other computing device hardware at a common geographic location or at different geographic locations. In some examples, the libraries 112, 114, 116, 118 are executed at the same server or cloud environment as the metadata identifier registry service 102.

The process library 112 comprises data describing process objects implemented by the one or more applications 120, 122, 124. The data model library 114 may provide information about different data models. For example, the data model library 114 may store indications of the data models used by different applications 120, 122, 124. The metadata library 116 may include metadata describing objects. For example, metadata for an object can include the definition of the object that is referred to by a local and/or global object identifier. The model extension library 118 may comprise information on extensions of data objects. For example, customers or other users of the applications 120, 122, 124 may make modifications or extensions to the data models used by the applications 120, 122, 124. The central management services system 104 may store these customer and user-generated extensions at the model extension library 118.

In some examples, the process library 112, data model library 114, metadata library 116, and/or model extension library 118 may be used by the registration service 106 and/or the information retrieval service 108 to consider registration and/or retrieval requests as described herein.

Consider an example in which an application 120, 122, 124 or user 132, 134 makes a retrieval request including a first local object identifier and requested information requesting which business process object is compatible with the object indicated by the first local object identifier. The information retrieval service 108 may utilize the metadata object repository 110 to determine a first global object identifier corresponding to the first local object identifier. The information retrieval service 108 may utilize the first global object identifier to query the process library for an indication of business processes that use the corresponding metadata object.

Consider another example in which an application 120, 122, 124 or user 132, 134 makes a retrieval request with a first local object identifier and a request for a corresponding extension in an indicated system. The information retrieval service 108 may use the metadata object repository 110 to determine a global object identifier corresponding to the first local object identifier. The information retrieval service 108 may use the global object identifier to query the model extension library to return an extension identifier of the requested extension.

Figure 2:
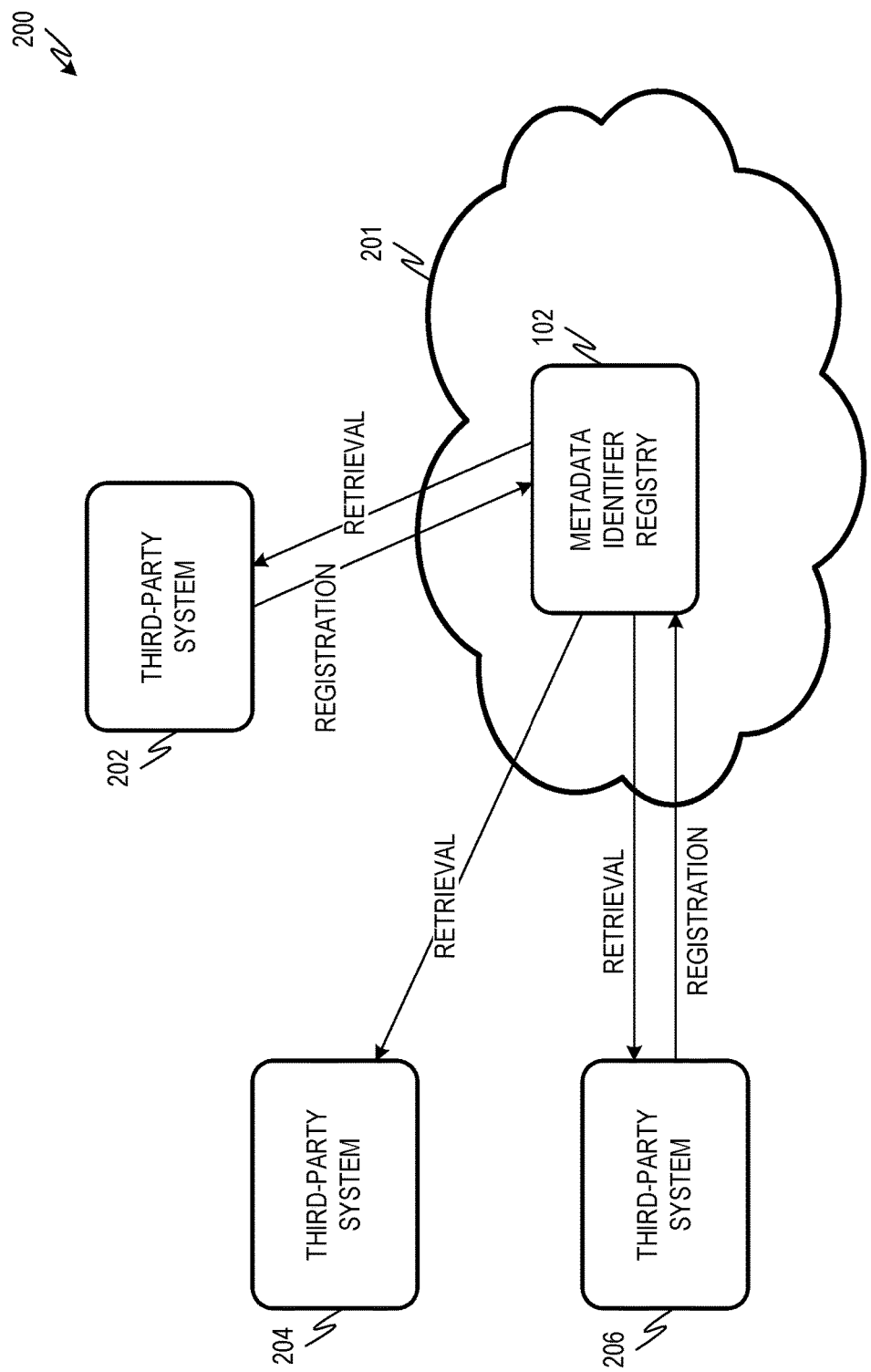
FIG. 2 is a diagram showing one example of an environment for implementing the metadata identifier registry service.

FIG. 2 is a diagram showing one example of an environment 200 for implementing the metadata identifier registry service 102. In the example of FIG. 2, the metadata identifier registry service 102 is implemented in a cloud environment 201. For example, the metadata identifier registry service 102 may be implemented at a server or other computing device that is accessible to multiple different third-party systems 202, 204, 206 via a network such as a wide area network (WAN) or local area network (LAN).

The various third-party systems 202, 204, 206 may be computing device systems implemented by various third-parties such as partner entities and/or customer entities, as described herein.

In some examples, the third-party systems 202, 204, 206 may be associated with one or more users, such as users 132, 134. Users may access various application instances or other resources via the third-party systems 202, 204, 206. For example, the third-party systems 202, 204, 206 may execute one or more instances of the applications 120, 122, 124. In some examples, one or more of the third-party systems 202, 204, 206 are associated with an instance of one or more of the applications 120, 122, 124 executing in the cloud environment 201 (or a different cloud environment) and accessible to the third-party system 202, 204, 206 and/or users thereof.

In some examples, different third-party systems 202, 204, 206 may have different functional relationships with the metadata identifier registry service 102. In the example of FIG. 2, for instance, the third-party system 202 and the third-party system 206 make retrieval requests and registration requests to the metadata identifier registry service 102, as described herein, while the third-party system 204 is permitted to makes retrieval requests only. For example, a third-party system 202, 204, 206 implemented by a partner entity may be provided with functionality to may registration requests and retrieval requests. In some examples, a third-party system 202, 204, 206 associated with a customer entity of the partner entity may be permitted to make retrieval requests only.

Figure 3:
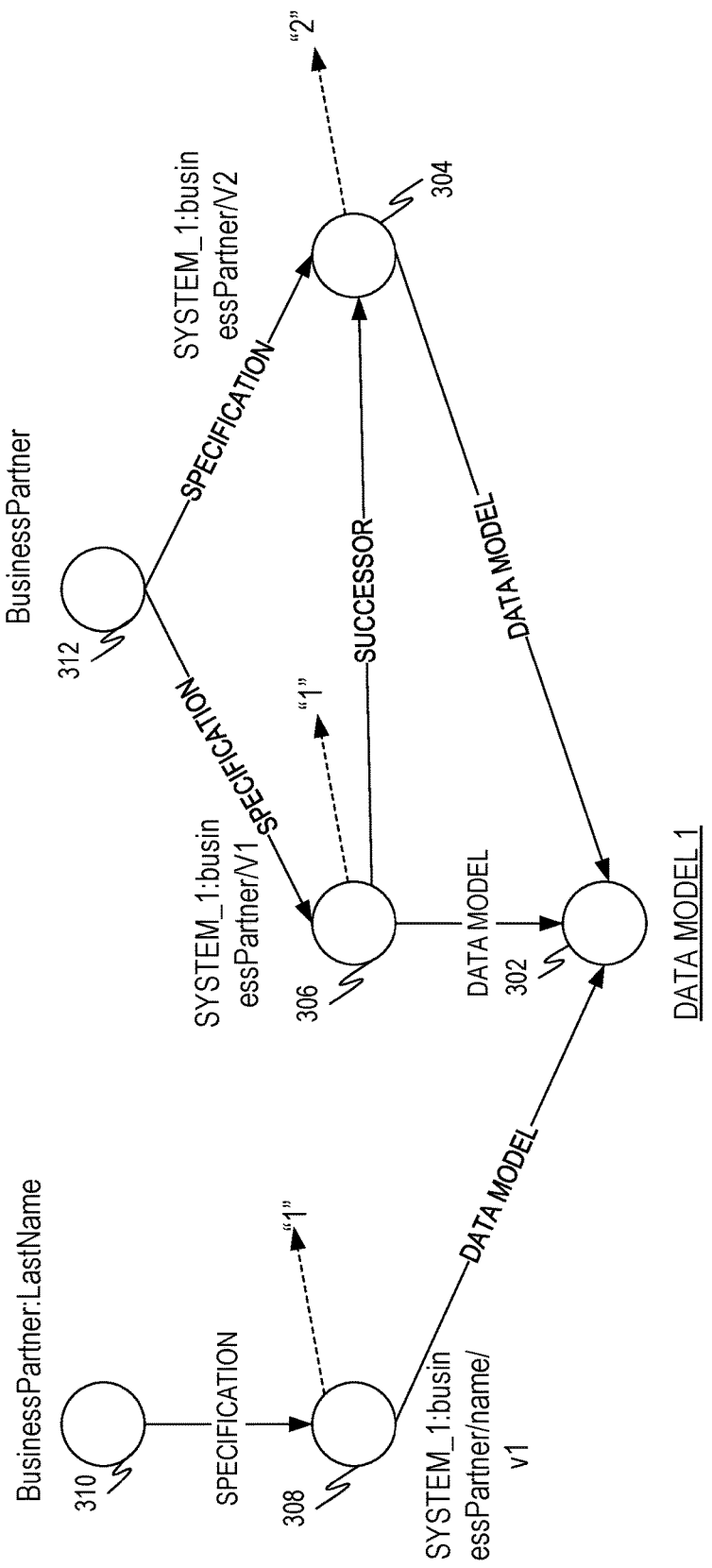
FIG. 3 is a diagram showing one example schema segment demonstrating an example schema for the metadata object repository.

FIG. 3 is a diagram showing one example schema segment 300 demonstrating an example schema for the metadata object repository 110. The example schema segment 300 includes two global object identifier nodes 310, 312. The global object identifier node 310 corresponds to a global object identifier "BusinessPartner:LastName." The global object identifier 310 is connected to a local object identifier node 308 by a specification edge. The local object identifier node 308 corresponds to a local object identifier "Data model_1:businesParner/name/v1." The specification edge between the global object identifier node 310 and the local object identifier node 308 indicates that the local object identifier corresponding to the node 308 is equivalent to the global object identifier corresponding to the node 310. The local object identifier node 308 is also connected by a data model edge to a node 302 corresponding to a data model labeled "DATA MODEL 1." The data model, DATA MODEL 1 may identify a data model of the local object identifier corresponding to the node 308. The local object identifier node 308 is also connected to a string "1" via a version edge, indicated by a dashed line. This indicates that the corresponding local object identifier is from version one of the DATA MODEL 1.

FIG. 3 also shows a global object identifier node 312 indicating a global object identifier called BusinessPartner. The global object identifier node 312 is connected by specification edges to two local object identifier nodes 304, 306. The local object identifier node 306 corresponds to a local object identifier "Data model_1:businessPartner/V1" while the local object identifier node 308 corresponds to a local object identifier "Data model_1:businessPartner/V2." This may indicate that the local object identifiers corresponding to nodes 306 and 304 are both equivalent to the global object identifier corresponding to the node 312. Local object identifier node 306 is also coupled to a string "1" via a version edge while local object identifier node 304 is coupled to a string "2" via a version edge. This indicates that the local object identifier corresponding to node 306 is associated with version one of DATA MODEL 1 while the local object identifier corresponding to node 304 is associated with version two of Data model 1. The relationship between the local object identifiers corresponding to nodes 306 and 304 is further indicated by a successor edge between the node 306 and the node 304. This indicates that the local object identifier corresponding the node 304 is a successor to the local object identifier corresponding to the node 306. Further, nodes 304, and 306 are both connected by respective data model edges to the data model node 302 corresponding to DATA MODEL 1.

Figure 4:
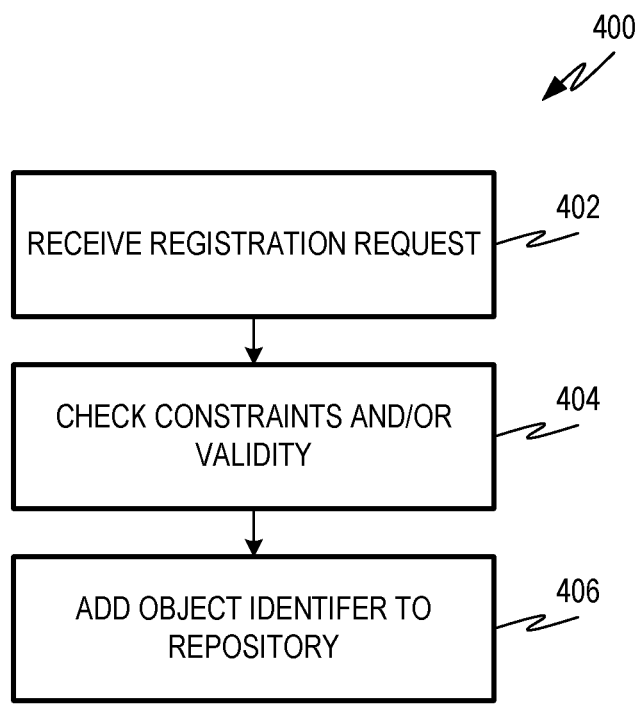
FIG. 4 is a flowchart showing one example of a process flow that may be executed by the registration service to process a registration request.

FIG. 4 is a flowchart showing one example of a process flow 400 that may be executed by the registration service 106 to process a registration request. At operation 402, the registration service 106 receives a registration request. For example, as described herein, the registration request may comprise a subject local object identifier, where the local object identifier references an object definition at a native data model used by one or more applications 120, 122, 124. The registration request may also include a second object identifier to be associated with the local object identifier and a relationship between the local object identifier and the second object identifier.

For example, if the second object identifier is a global object identifier, the proposed relationship may be equivalence (e.g., the local object identifier is equivalent to the global object identifier). If the second object identifier is another local object identifier, the proposed relationship may be a successor relationship and/or a predecessor relationship.

In some examples, the registration request also includes another object identifier or identifiers and relationships between the subject local object identifier and the other object identifier or identifiers. Also, in some examples, the registration request includes other information about the local object identifier such as, for example, the native data model of the local object identifier, a version of the native data model of the local object identifier, etc.

In some examples, the subject local object identifier indicated by the registration request has already been registered at the metadata object repository 110. For example, the subject local object identifier may have been previously registered and the registration request received at operation 402 may be a subsequent registration request to register additional information about the subject local object identifier. For example, consistent with the open data assumption, the subject local object identifier may have been initially registered with one piece of information (e.g., that the subject local object identifier is from a particular data model). A subsequent registration request may add additional information that was not provided at the time of the initial registration (e.g., a version of the data model, a predecessor or successor local object identifier, an indication of a global object identifier). In this way, a single local object identifier may be subject to multiple registration requests.

At operation 404, the registration service 106 may check constraints and/or validity of the registration request. This may include performing one or more actions to determine whether the proposed relationship between the subject local object identifier and the second object identifier is valid. (If the registration request includes relationships between the subject local object identifier and other object identifiers, these too may be checked.)

Validity checks may be performed, for example, using information from known data models and/or information already stored at the metadata object repository 110. If the registration service 106 determines that a registration request is invalid or fails to meet applicable constraints, the registration may be aborted.

Consider an example in which a subject local object identifier B is indicated in the registration request to be equivalent to a global object identifier D. In this example, one or more of the data models corresponding to B (e.g., retrieved from the data model library 114) and/or the existing state of the metadata object repository 110 may indicate that a local object identifier A is distinct from the local object identifier B and that a global object identifier C is a sub-type of the global object identifier D. Further, the local object identifier A may have already be registered at the metadata object repository 110 as equivalent to the global object identifier C. Based on this example, the registration service 106 may determine that the local object identifier B cannot be equivalent to the global object identifier D.

At operation 406, the registration service 106 may add the subject local object identifier to the metadata object repository 110 along with an indication of the relationship between the local object identifier and the second object identifier. In examples in which the metadata object repository is implemented using a triple store data base, this may include writing a first record to the metadata object repository where the first record includes a first field indicating the subject local object identifier, a second field indicating a second object identifier, and a relationship field indicating the relationship between the subject object identifier and the second object identifier.

In examples where the registration request also includes other information about the subject local object identifier, the operation 406 may also include writing the other information to the metadata object repository 110. For example, this may include writing other triple store or label-property-graph records. For example, if the registration request also indicates a native data model of the subject local object identifier, the registration service 106 may write a record having a first field indicating the subject local object identifier, a second field indicating the native data model, and a relationship field indicating that the subject local object identifier is a part of the indicated data model. If the registration request also indicated a version of the native data model, the registration service 106 may write a record having a first field indicating the subject local object identifier, a second field indicating the version, and a relationship field indicating that the subject local object identifier is from the indicated version of its native data model.

Figure 5:
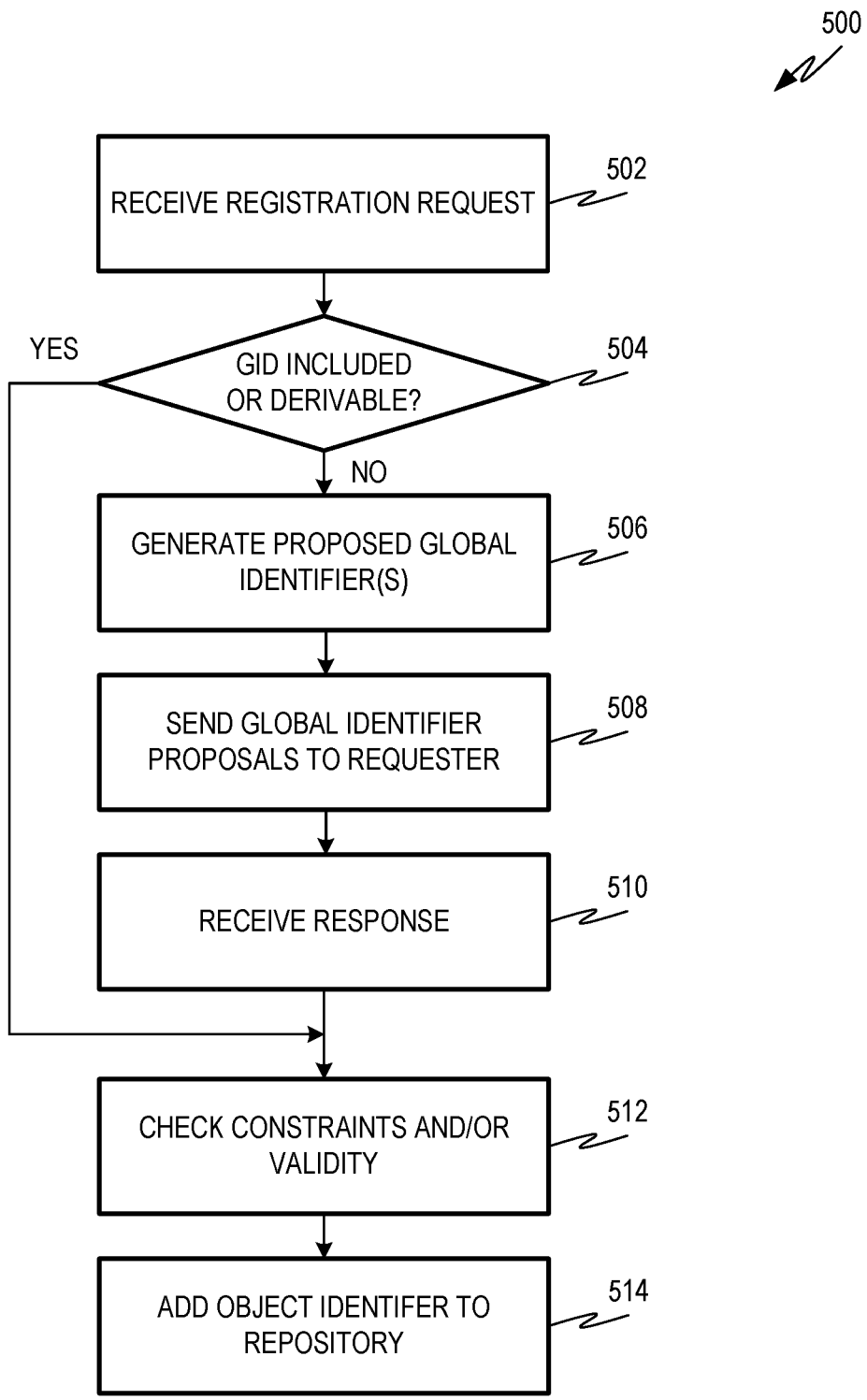
FIG. 5 is a flowchart showing another example of a process flow that may be executed by the registration service to process a registration request.

FIG. 5 is a flowchart showing another example of a process flow 500 that may be executed by the registration service 106 to process a registration request. At operation 502, the registration service 106 receives a registration request. The registration request may be similar to the registration request received at operation 402. At operation 504, the registration service 106 determines whether the global object identifier associated with the subject local object identifier is either included in the registration request or derivable. For example, the registration request may lack a global object identifier if application 120, 122, 124 or user 132, 134 making the registration request was not be aware of an appropriate global object identifier that is equivalent to the subject local object identifier. Also, in some examples, the registration request may include another local object identifier having an indicated relationship (e.g., predecessor or successor) to the subject local object identifier but lack a global object identifier. In other examples, as described in more detail with respect to FIG. 6, the registration request may have been prompted by a retrieval request referencing a local object identifier not described at the metadata object repository 110 (and therefore not yet associated with a global object identifier).

A registration request lacking a global object identifier may still allow the registration service 106 to accurately derive the global object identifier equivalent to the subject local object identifier. For example, the subject local object identifier may be previously been registered to a global object identifier. Also, for example, if the registration request indicates a relationship between the subject local object identifier and a second local object identifier (e.g., a successor or predecessor object identifier), the registration service 106 may imply that the subject local object identifier is equivalent to the same global object identifier as the second local object identifier.

If the global object identifier is either included in the registration request or derivable from the registration request and the metadata object repository 110, the registration service may proceed to operation 512. If the global object identifier is not included in the registration request and not derivable from the registration request and the metadata object repository 110, the registration service 106, at operation 504, generates one or more proposed global object identifiers. For example, the registration service 106 may determine one or more proposed global object identifiers that may be equivalent to the local object identifier indicated by the registration request.

In some examples, the registration service executes one or more trained machine learning models to identify proposed global object identifiers for the indicated local object identifier. A machine learning model may receive the local object identifier and any other information about the local object identifier that is included in the registration request and/or otherwise known to the registration service 106. The trained machine learning model may generate one or more global object identifiers from the metadata object repository, where the one or more global object identifiers make up some or all of the proposed global object identifiers.

At operation 508, the registration service 106 sends the proposed global object identifier(s) to the requesting party (e.g., an application 120, 122, 124 and/or user 132, 134). The requesting party may provide a response to the registration service 106 that either selects one of the proposed global object identifiers as the global object identifier for the subject local object identifier or rejects all of the proposed global object identifiers. The response may be received at operation 510. (If no response is received, the registration service 106 may proceed as if all of the proposed global object identifiers were rejected.)

At operation 512, the registration service 106 checks constraints and/or validity associated with the registration request including a selected global object identifier if one was included with the registration request or selected in the response received at operation 510. Provided that checks and constraints are cleared, the registration service may add the subject local object identifier to the metadata object repository 110, for example, as described above with respect to operation 406.

Figure 6:
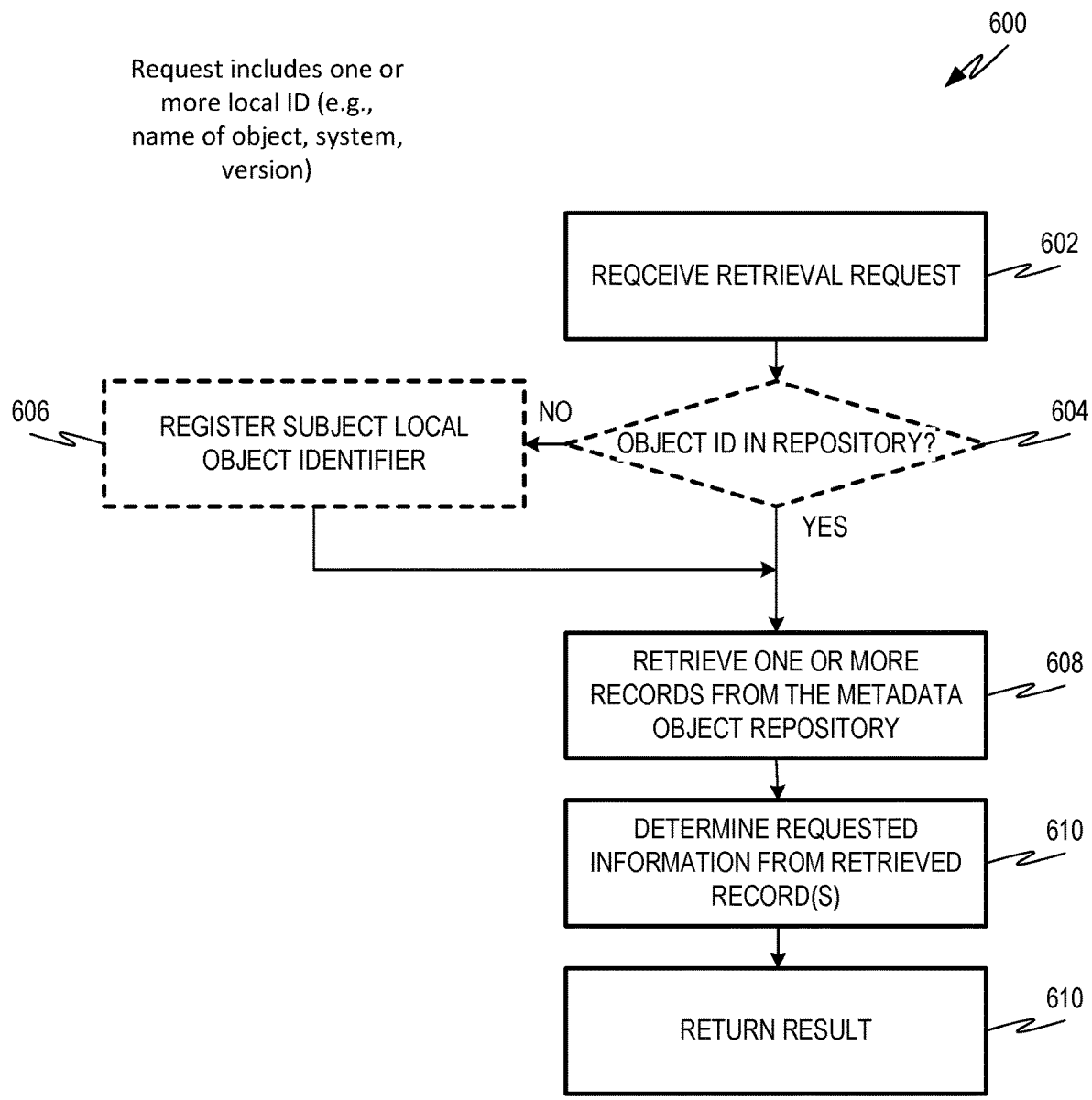
FIG. 6 is a flowchart showing one example of a process flow that may be executed by the information retrieval service to respond to a retrieval request.

FIG. 6 is a flowchart showing one example of a process flow 600 that may be executed by the information retrieval service 108 to respond to a retrieval request. At operation 602, the information retrieval service 108 receives a retrieval request from a user 132, 134 and/or application 120, 122, 124. The retrieval request may include a subject local object identifier and requested information.

At optional operation 614, the information retrieval service 108 determines if the subject local object identifier is already registered at the metadata object repository 110. If the local object identifier is not registered at the metadata object repository 110, the information retrieval service 108 may, at operation 606, prompt a registration request to register the subject local object identifier at the metadata object repository 110. The registration service 106 may process the prompted registration request, for example, as described herein with respect to FIG. 4 and/or FIG. 5. In some examples, if the subject local object identifier is not registered at the metadata object repository, the information retrieval service 108 may return an error in response to the retrieval request.

If, at operation 604 it is determined that the subject local object identifier is registered at the metadata object repository 110 (or after the subject local object identifier is registered at the metadata object repository 110 at operation 606), the information retrieval service 108 may retrieve one or more records from the metadata object repository 110 at operation 608 and determine the requested information from the retrieved records at operation 610. The information retrieval service 108 returns the result (e.g., the requested information) to the requester at operation 610.

Consider an example information retrieval request including a subject local object identifier called "Business Partner" from "Version 1" of a data model called "Data Model 1" and requested information indicating an equivalent local object identifier in a different data model "Data Model 2." First, this retrieval request will be analyzed for the example case in which the metadata object repository is organized with a triple store or label-property graph style of database. The information retrieval service 108 may search by the subject local object identifier to retrieve a first record represented by TABLE 1 below:

TABLE 1

| First Field | Second Field | Relationship Field |
| --- | --- | --- |
| Business Partner | Business_Partner | Specification |

The record of TABLE 1 indicates the global object identifier "Business_Partner" associated with the subject local object identifier "Business Partner" from Data Model 1. The information retrieval service 108 may use the global object identifier to retrieve a second record indicated by TABLE 2:

TABLE 2

| First Field | Second Field | Relationship Field |
| --- | --- | --- |
| B_P | Business_Partner | Specification |

The record of TABLE 2 indicates that the local object identifier B_P is also equivalent to the global object identifier "Business_Partner." The information retrieval service 108 may use the local object identifier B_P to retrieve an additional record given by TABLE 3:

TABLE 3

| First Field | Second Field | Relationship Field |
| --- | --- | --- |
| B_P | Data Model 2 | Data Model |

The record given by TABLE 3 indicates that the local object identifier B_P is from Data Model 2. Accordingly, the information retrieval service 108 may determine that the local object identifier "B_P" meets the requested information and return "B_P" in response to the retrieval request.

Next, the example retrieval request will be considered in an example in which the metadata object repository 110 is implemented using a relational database. Consider TABLE 4 below, which represents an example table at the metadata object repository organized in a relational database:

TABLE 4

| Global Object ID | Local Object ID | Data Model | Version |
| --- | --- | --- | --- |
| Business_Partner | Business Partner | Data Model 1 | 1 |
| Business_Partner | B_P | Data Model 2 | 1 |
| Business_Partner | 19f3371c-b5b3-470f-94ef-20673155ed | Data Model 3 | 1 |
| Business_Partner | 19f3371c-b5b3-470f-94ef-20673155ed | Data Model 3 | 2 |

In this example, the information retrieval service 108 may retrieve the first record in the table indicating that the subject local object identifier "Business Partner" is equivalent to the global object identifier "Business Partner." The information retrieval service 108 may subsequently query for the record having "Business_Partner" at a global object identifier field and indicating "Data Model 2" at a data model field. This returns the record indicating the local object identifier "B_P," which may be returned to the requester.

Figure 7:
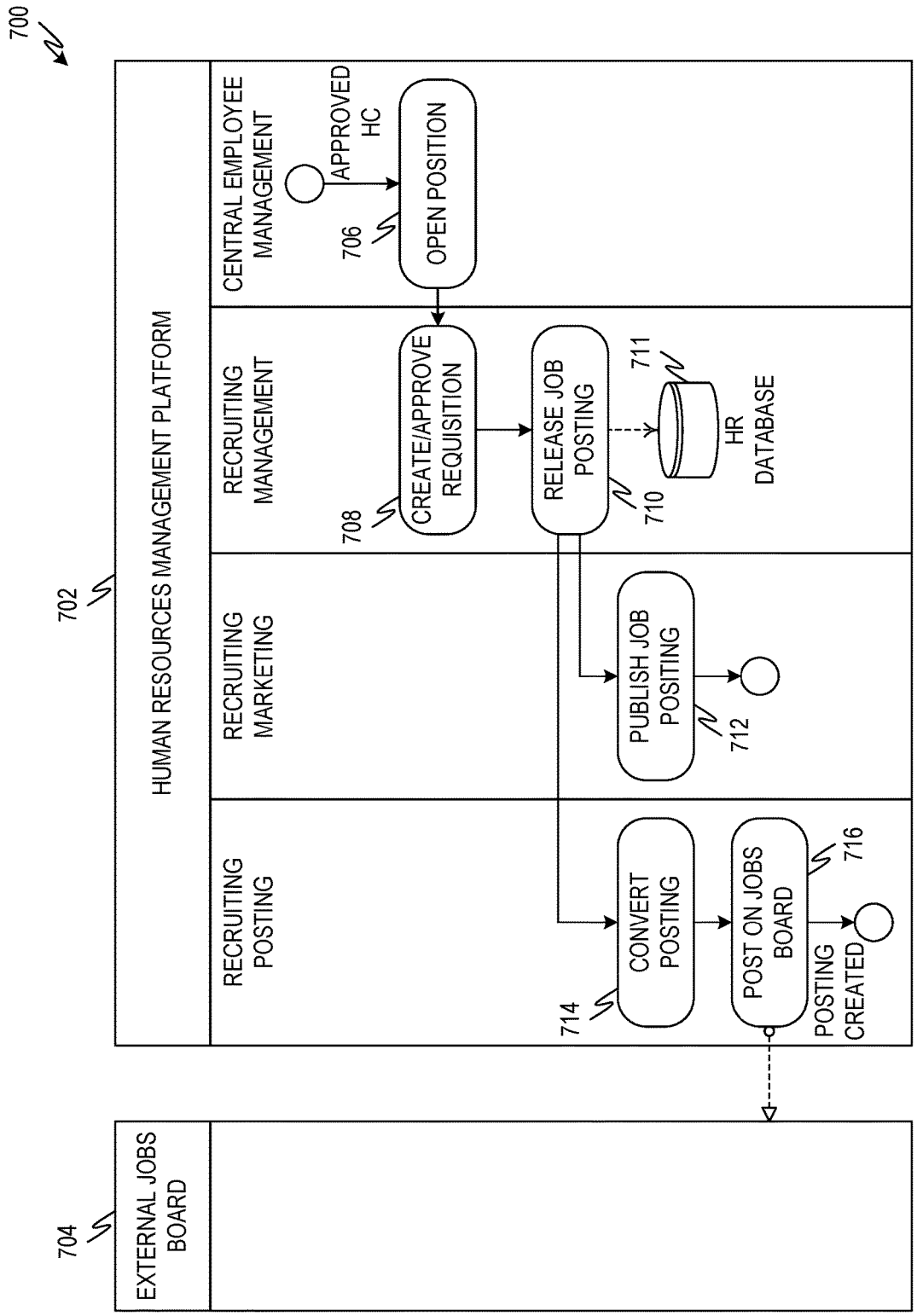
FIG. 7 is a workflow demonstrating an example context for using a metadata identifier registry as described herein.

FIG. 7 is a workflow 700 demonstrating an example context for using a metadata identifier registry as described herein. The workflow 700 includes a human resources management platform 702 and an external jobs board 704 that execute the creation and positing of a job opening. The human resources management platform 702 may be an application, such as one of applications 120, 122, 124. The human resources management platform includes a central employee management module, a recruiting management module, a recruiting marketing module, and a recruiting posting module. The various modules, in some examples, are separate applications, such as applications 120, 122, 124 and/or modules or functionalities implemented within the human resources management platform. In some examples, the modules of the human resources management platform 702 utilize a common data model. The workflow 700 also includes various processes 706, 708, 710, 712, 714, 716. These processes, in some examples, are described by local object identifiers stored at the metadata object repository 110.

An open position process 706 may receive approved headcount data indicating an additional employee is authorized and should be hired. The open position process 706 prompts a create/approve requisition process 708 to generate a requisition for a job posting to fill the now-open position. The create/approve requisition process 708 calls a release job posting process 710. The release job posting process pulls the job posting from a human resources database 711 and provides it to a publish job posting process 712. The publish job posting process 712 may publish the retrieved job posting on an internal website. The release job posting process 710 may also call a convert posting process 714 that converts the retrieved job posting to a formal suitable for the external jobs board 704. The convert posting process 714 calls a post on jobs board process 716 that provides the converted job posting to the external jobs board 704. For example, the external jobs board 704 may be implemented by a different entity than the human resources management platform, such as a recruiting entity, advertising entity, or other suitable entity.

In the example of FIG. 7, the release job posting process 710 access the human resources database 711. The database management system for the human resources database 711, in some examples, uses a different data model than the human resources management platform. Accordingly, prior to retrieving the job posting from the human resources database 711, the release job posting process 710 may direct a retrieval request to the information retrieval service 108. The retrieval request may indicate the local object identifier of the job posting in the data model used by the human resources management platform and requested information indicating the data model used by the human resources database. The information retrieval service 108 may return the local object identifier corresponding to the job posting in the data model used by the human resources database, which may be used by the release job posting process to query the human resources database for the job posting.

In view of the disclosure above, various examples are set forth below. It should be noted that one or more features of an example, taken in isolation or combination, should be considered within the disclosure of this application.

EXAMPLES

Example 1 is a system of administering data model metadata for a plurality of data models, the system comprising: at least one processor programmed to perform operations comprising: receiving, by a metadata service executed by the at least one processor, a first retrieval request from a requesting system, the first retrieval request comprising an indication of a first local object identifier, the first local object identifier referencing a definition of a first local object from a first data model and an indication of a target data model; retrieving, by the metadata service, a first record from a metadata object repository, the first record comprising an indication of the first local object identifier and an indication of a first global object identifier corresponding to the first local object identifier; determining, by the metadata service using the first global object identifier, a second local object identifier referencing a definition of a second local object identifier referencing a definition of a second local object in the target data model; and returning, by the metadata service, the second local object identifier to the requesting system in response to the first retrieval request.

In Example 2, the subject matter of Example 1 optionally includes wherein the first record comprises a first field indicating the first local object identifier; a second field indicating the first global object identifier; and a relationship field indicating that the first global object identifier and the first local object identifier are equivalent.

In Example 3, the subject matter of Example 2 optionally includes the first retrieval request further comprising an indication of a first relationship, the operations further comprising: retrieving a second record from the metadata object repository, the second record comprising a first field indicating the first global object identifier, a second field indicating the second local object identifier, and a relationship field indicating that the first global object identifier and the second local object identifier are equivalent; and retrieving a third record from the metadata object repository, the third record comprising a first field indicating the second local object identifier, a second field indicating the target data model, and a relationship field indicating that the second local object identifier is associated with the target data model.

In Example 4, the subject matter of Example 3 optionally includes the first retrieval request further comprising an indication of a version of the target data model, the operations further comprising: retrieving a fourth record from the metadata object repository, the fourth record comprising a first field indicating the second local object identifier, a second field indicating the version of the target data model, and a relationship field indicating that the second local object identifier is associated with the version of the target data model.

In Example 5, the subject matter of any one or more of Examples 2-4 optionally includes the first record and the second record being triple store records and the metadata object repository comprising a triple store database comprising the first record and the second record.

In Example 6, the subject matter of any one or more of Examples 1-5 optionally includes the operations further comprising: receiving a second retrieval request, the second retrieval request comprising an indication of a third local object identifier referencing a definition of a third local object from the first data model, an indication of the target data model, and a relationship indicating at least one of successor or predecessor; and retrieving a second record from the metadata object repository, the second record comprising an indication of the third local object identifier, an indication of a fourth local object identifier from the first data model, and an indication that the fourth local object identifier is at least one of a successor to the third local object identifier or a predecessor of the third local object identifier.

In Example 7, the subject matter of any one or more of Examples 1-6 optionally includes the operations further comprising: receiving, from a requesting system, a registration request comprising the first local object identifier; and writing the first record to the metadata object repository.

In Example 8, the subject matter of Example 7 optionally includes the operations further comprising: generating a set of suggested global object identifiers, the set of suggested global object identifiers comprising the first global object identifier; providing the set of suggested global object identifiers to the requesting system; and receiving, from the requesting system, an indication of the first global object identifier.

Example 9 is a method of administering data model metadata for a plurality of data models, the method comprising: receiving, by a metadata service, a first retrieval request from a requesting system, the first retrieval request comprising an indication of a first local object identifier, the first local object identifier referencing a definition of a first local object from a first data model and an indication of a target data model; retrieving, by the metadata service, a first record from a metadata object repository, the first record comprising an indication of the first local object identifier and an indication of a first global object identifier corresponding to the first local object identifier; determining, by the metadata service using the first global object identifier, a second local object identifier referencing a definition of a second local object identifier referencing a definition of a second local object in the target data model; and returning, by the metadata service, the second local object identifier to the requesting system in response to the first retrieval request.

In Example 10, the subject matter of Example 9 optionally includes wherein the first record comprises a first field indicating the first local object identifier; a second field indicating the first global object identifier; and a relationship field indicating that the first global object identifier and the first local object identifier are equivalent.

In Example 11, the subject matter of Example 10 optionally includes the first retrieval request further comprising an indication of a first relationship, the method further comprising: retrieving a second record from the metadata object repository, the second record comprising a first field indicating the first global object identifier, a second field indicating the second local object identifier, and a relationship field indicating that the first global object identifier and the second local object identifier are equivalent; and retrieving a third record from the metadata object repository, the third record comprising a first field indicating the second local object identifier, a second field indicating the target data model, and a relationship field indicating that the second local object identifier is associated with the target data model.

In Example 12, the subject matter of Example 11 optionally includes the first retrieval request further comprising an indication of a version of the target data model, the method further comprising: retrieving a fourth record from the metadata object repository, the fourth record comprising a first field indicating the second local object identifier, a second field indicating the version of the target data model, and a relationship field indicating that the second local object identifier is associated with the version of the target data model.

In Example 13, the subject matter of any one or more of Examples 10-12 optionally includes the first record and the second record being triple store records and the metadata object repository comprising a triple store database comprising the first record and the second record.

In Example 14, the subject matter of any one or more of Examples 9-13 optionally includes receiving a second retrieval request, the second retrieval request comprising an indication of a third local object identifier referencing a definition of a third local object from the first data model, an indication of the target data model, and a relationship indicating at least one of successor or predecessor; and retrieving a second record from the metadata object repository, the second record comprising an indication of the third local object identifier, an indication of a fourth local object identifier from the first data model, and an indication that the fourth local object identifier is at least one of a successor to the third local object identifier or a predecessor of the third local object identifier.

In Example 15, the subject matter of any one or more of Examples 9-14 optionally includes receiving, from a requesting system, a registration request comprising the first local object identifier; and writing the first record to the metadata object repository.

In Example 16, the subject matter of Example 15 optionally includes generating a set of suggested global object identifiers, the set of suggested global object identifiers comprising the first global object identifier; providing the set of suggested global object identifiers to the requesting system; and receiving, from the requesting system, an indication of the first global object identifier.

In Example 17, the subject matter of Example 16 optionally includes the registration request comprising an indication of the first global object identifier.

In Example 18, the subject matter of any one or more of Examples 16-17 optionally includes after writing the first record to the metadata object repository, receiving a second registration request from the requesting system, the second registration request comprising the first local object identifier and a version number; and writing a second record to the metadata object repository, the second record comprising a first field indicating the first local object identifier, a second field comprising a version number, and a relationship field indicating that the first local object identifier is associated with the version number of the first data model.

In Example 19, the subject matter of any one or more of Examples 9-18 optionally includes receiving a second retrieval request from the requesting system, the second retrieval request comprising a third local object identifier referencing a definition of a third local object from the first data model; determining that no record at the metadata object repository corresponds to the first local object identifier; and writing to the metadata object repository a second record, the second record comprising an indication of the third local object identifier and an indication of a second global object identifier corresponding to the second global object identifier.

Example 20 is a non-transitory machine-readable medium comprising instructions thereon that, when executed by at least one processor, causes the at least one processor to perform operations comprising: receiving a first retrieval request from a requesting system, the first retrieval request comprising an indication of a first local object identifier, the first local object identifier referencing a definition of a first local object from a first data model and an indication of a target data model; retrieving a first record from a metadata object repository, the first record comprising an indication of the first local object identifier and an indication of a first global object identifier corresponding to the first local object identifier; determining, using the first global object identifier, a second local object identifier referencing a definition of a second local object identifier referencing a definition of a second local object in the target data model; and returning the second local object identifier to the requesting system in response to the first retrieval request.

Figure 8:
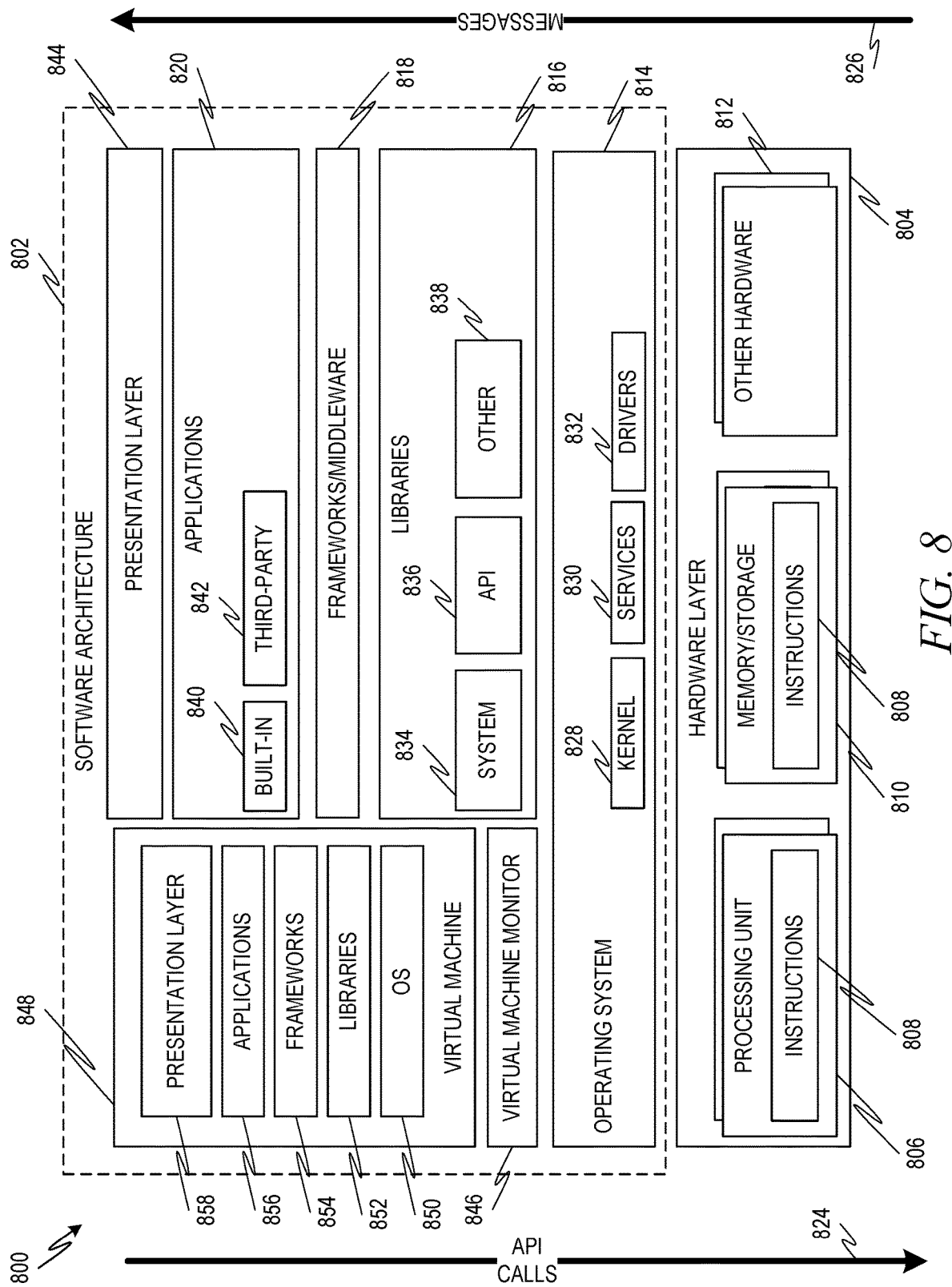
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. The software architecture 802 and various other components described in FIG. 8 may be used to implement various other systems described herein. For example, the software architecture 802 shows one example way for implementing a system for hosting one or more of the applications 120, 122, 124 and/or the metadata identifier registry service 102. In FIG. 8, a representative hardware layer 804 is illustrated and can represent, for example, any of the above referenced computing devices, including user computing devices 128, 130 and/or one or more servers or other suitable computing hardware for implementing the various applications and services described herein. In some examples, the hardware layer 804 may be implemented according to the architecture of the computer system of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the architecture 802.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and presentation layer 844. Operationally, the applications 820 and/or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 (also sometimes referred to as middleware) may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries (e.g., system 834, APIs 836, and other libraries 838), and frameworks/middleware 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. For example, the applications 120, 122, 124 may be implemented at one or more virtual machines. Also, in some examples, a cloud environment comprising one or more virtual machines may implement all or part of the metadata identifier registry service 102. The example of FIG. 12 illustrates by virtual machine 848. A virtual machine creates a software environment where applications/modules can execute as if they were executing on a hardware computing device. A virtual machine 848 is hosted by a host operating system (operating system 814) and typically, although not always, has a virtual machine monitor 846, which manages the operation of the virtual machine 848 as well as the interface with the host operating system (i.e., operating system 814). A software architecture executes within the virtual machine 848 such as an operating system 850, libraries 852, frameworks/middleware 854, applications 856 and/or presentation layer 858. These layers of software architecture executing within the virtual machine 848 can be the same as corresponding layers previously described or may be different.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

Computer software, including code for implementing software services can be written in any form of programming language, including compiled or interpreted languages, and it can be deployed in any form, including as a standalone program or as a module, subroutine, or other unit suitable for use in a computing environment. Computer software can be deployed to be executed on one computer or on multiple computers at one site or distributed across multiple sites and interconnected by a communication network.

In example embodiments, operations may be performed by one or more programmable processors executing a computer program to perform functions by operating on input data and generating output.

Figure 9:
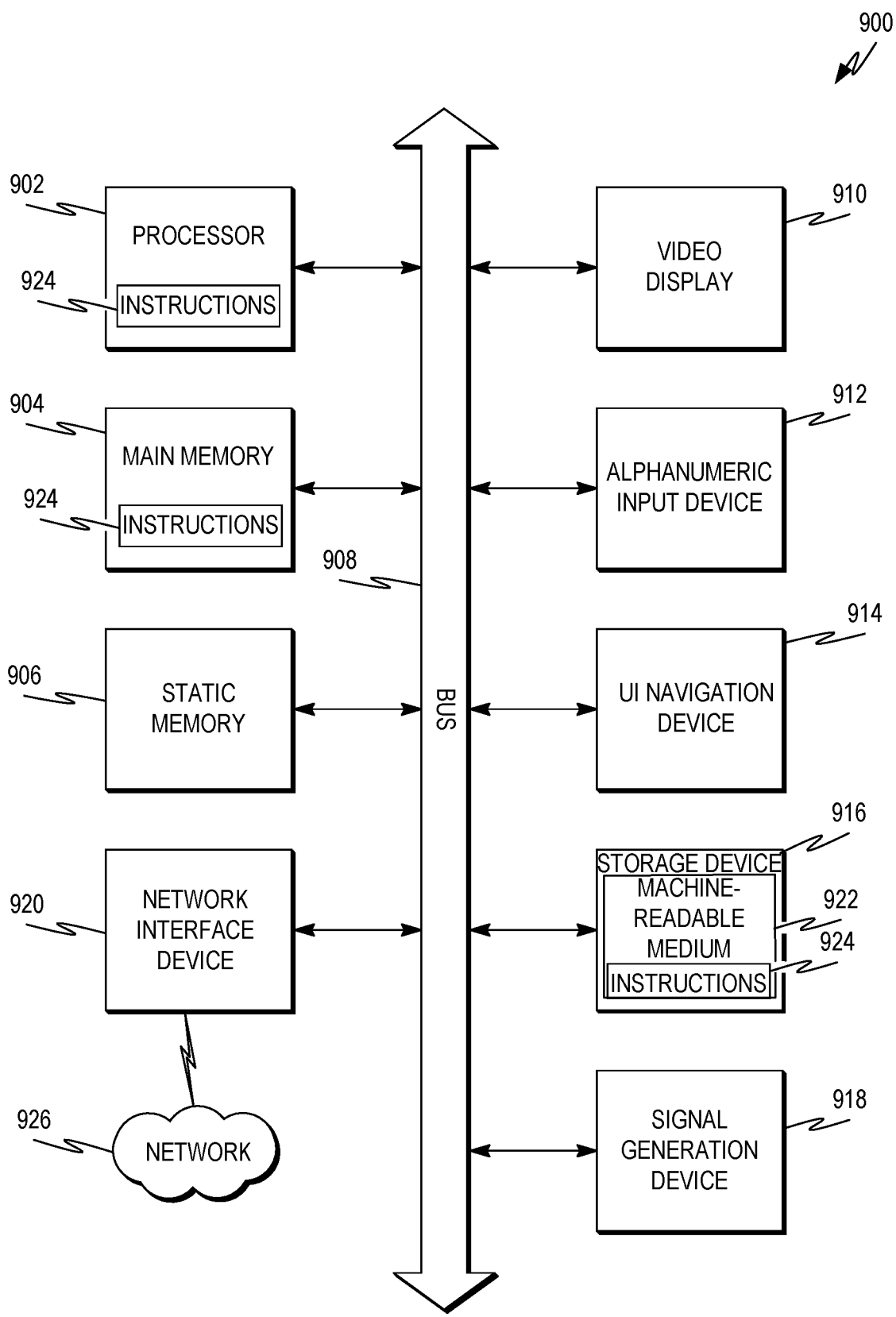
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. For example, the computer system 900 shows one example implementation that can be used for any of the computing devices shown in the environment 100, environment 200, process flow 500, process flow 600 or otherwise described herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system of administering data model metadata for a plurality of data models, the system comprising:
   at least one processor programmed to perform operations comprising:
   receiving, by a metadata service executed by the at least one processor, a first retrieval request from a requesting system, the first retrieval request comprising an indication of first local object identifier, the first local object identifier referencing a definition of a first local object from a first data model and an indication of a target data model;
   retrieving, by the metadata service, a first record from a metadata object repository, the first record comprising an indication of the first local object identifier and an indication of a first global object identifier corresponding to the first local object identifier;
determining, by the metadata service using the first global object identifier, a second local object identifier referencing a definition of a second local object identifier referencing a definition of a second local object in the target data model; and
returning, by the metadata service, the second local object identifier to the requesting system in response to the first retrieval request.

2. The system of claim 1, wherein the first record comprises a first field indicating the first local object identifier; a second field indicating the first global object identifier; and a relationship field indicating that the first global object identifier and the first local object identifier are equivalent.

3. The system of claim 2, the first retrieval request further comprising an indication of a first relationship, the operations further comprising:
retrieving a second record from the metadata object repository, the second record comprising a first field indicating the first global object identifier, a second field indicating the second local object identifier, and a relationship field indicating that the first global object identifier and the second local object identifier are equivalent; and
retrieving a third record from the metadata object repository, the third record comprising a first field indicating the second local object identifier, a second field indicating the target data model, and a relationship field indicating that the second local object identifier is associated with the target data model.

4. The system of claim 3, the first retrieval request further comprising an indication of a version of the target data model, the operations further comprising:
retrieving a fourth record from the metadata object repository, the fourth record comprising a first field indicating the second local object identifier, a second field indicating the version of the target data model, and a relationship field indicating that the second local object identifier is associated with the version of the target data model.

5. The system of claim 3, the first record and the second record being triple store records and the metadata object repository comprising a triple store database comprising the first record and the second record.

6. The system of claim 1, the operations further comprising:
receiving a second retrieval request, the second retrieval request comprising an indication of a third local object identifier referencing a definition of a third local object from the first data model, an indication of the target data model, and a relationship indicating at least one of successor or predecessor; and
retrieving a second record from the metadata object repository, the second record comprising an indication of the third local object identifier, an indication of a fourth local object identifier from the first data model, and an indication that the fourth local object identifier is at least one of a successor to the third local object identifier or a predecessor of the third local object identifier.

7. The system of claim 1, the operations further comprising:
receiving, from a requesting system, a registration request comprising the first local object identifier; and
writing the first record to the metadata object repository.

8. The system of claim 7, the operations further comprising:
generating a set of suggested global object identifiers, the set of suggested global object identifiers comprising the first global object identifier;
providing the set of suggested global object identifiers to the requesting system; and
receiving, from the requesting system, an indication of the first global object identifier.

9. A method of administering data model metadata for a plurality of data models, the method comprising:
receiving, by a metadata service, a first retrieval request from a requesting system, the first retrieval request comprising an indication of a first local object identifier, the first local object identifier referencing a definition of a first local object from a first data model and an indication of a target data model;
retrieving, by the metadata service, a first record from a metadata object repository, the first record comprising an indication of the first local object identifier and an indication of a first global object identifier corresponding to the first local object identifier;
determining, by the metadata service using the first global object identifier, a second local object identifier referencing a definition of a second local object identifier referencing a definition of a second local object in the target data model; and
returning, by the metadata service, the second local object identifier to the requesting system in response to the first retrieval request.

10. The method of claim 9, wherein the first record comprises a first field indicating the first local object identifier; a second field indicating the first global object identifier; and a relationship field indicating that the first global object identifier and the first local object identifier are equivalent.

11. The method of claim 10, the first retrieval request further comprising an indication of a first relationship, the method further comprising:
retrieving a second record from the metadata object repository, the second record comprising a first field indicating the first global object identifier, a second field indicating the second local object identifier, and a relationship field indicating that the first global object identifier and the second local object identifier are equivalent; and
retrieving a third record from the metadata object repository, the third record comprising a first field indicating the second local object identifier, a second field indicating the target data model, and a relationship field indicating that the second local object identifier is associated with the target data model.

12. The method of claim 11, the first retrieval request further comprising an indication of a version of the target data model, the method further comprising:
retrieving a fourth record from the metadata object repository, the fourth record comprising a first field indicating the second local object identifier, a second field indicating the version of the target data model, and a relationship field indicating that the second local object identifier is associated with the version of the target data model.

13. The method of claim 11, the first record and the second record being triple store records and the metadata object repository comprising a triple store database comprising the first record and the second record.

14. The method of claim 9, further comprising:
receiving a second retrieval request, the second retrieval request comprising an indication of a third local object identifier referencing a definition of a third local object from the first data model, an indication of the target data model, and a relationship indicating at least one of successor or predecessor; and
retrieving a second record from the metadata object repository, the second record comprising an indication of the third local object identifier, an indication of a fourth local object identifier from the first data model, and an indication that the fourth local object identifier is at least one of a successor to the third local object identifier or a predecessor of the third local object identifier.

15. The method of claim 9, further comprising:
receiving, from a requesting system, a registration request comprising the first local object identifier; and
writing the first record to the metadata object repository.

16. The method of claim 15, further comprising:
generating a set of suggested global object identifiers, the set of suggested global object identifiers comprising the first global object identifier;
providing the set of suggested global object identifiers to the requesting system; and
receiving, from the requesting system, an indication of the first global object identifier.

17. The method of claim 16, the registration request comprising an indication of the first global object identifier.

18. The method of claim 16, further comprising:
after writing the first record to the metadata object repository, receiving a second registration request from the requesting system, the second registration request comprising the first local object identifier and a version number; and
writing a second record to the metadata object repository, the second record comprising a first field indicating the first local object identifier, a second field comprising a version number, and a relationship field indicating that the first local object identifier is associated with the version number of the first data model.

19. The method of claim 9, further comprising:
receiving a second retrieval request from the requesting system, the second retrieval request comprising a third local object identifier referencing a definition of a third local object from the first data model;
determining that no record at the metadata object repository corresponds to the first local object identifier; and
writing to the metadata object repository a second record, the second record comprising an indication of the third local object identifier and an indication of a second global object identifier corresponding to the second global object identifier.

20. A non-transitory machine-readable medium comprising instructions thereon that, when executed by at least one processor, causes the at least one processor to perform operations comprising:
receiving a first retrieval request from a requesting system, the first retrieval request comprising an indication of a first local object identifier, the first local object identifier referencing a definition of a first local object from a first data model and an indication of a target data model;
retrieving a first record from a metadata object repository, the first record comprising an indication of the first local object identifier and an indication of a first global object identifier corresponding to the first local object identifier;
determining, using the first global object identifier, a second local object identifier referencing a definition of a second local object identifier referencing a definition of a second local object in the target data model; and
returning the second local object identifier to the requesting system in response to the first retrieval request.

* * * * *